United States Patent [19]

Chambers et al.

[11] 3,818,247

[45] June 18, 1974

[54] TWO-LEAD ELECTRICAL CONTROL APPARATUS

[75] Inventors: William W. Chambers, Anaheim; Charles C. Olander, Huntington Beach; James N. Brooks, Hermosa Beach, all of Calif.

[73] Assignee: Robertshaw Controls Company, Richmond, Va.

[22] Filed: Apr. 3, 1972

[21] Appl. No.: 240,700

[52] U.S. Cl. ............ 307/252 F, 219/489, 219/499, 219/501, 307/252 W

[51] Int. Cl. ............................................ H03k 17/72

[58] Field of Search ....... 307/252 F, 252 N, 252 W; 219/499, 501, 489

[56] References Cited

UNITED STATES PATENTS

| | | | |
|---|---|---|---|
| 3,648,074 | 3/1972 | Nurnberg | 307/252 F |
| 3,678,247 | 7/1972 | Sawa et al. | 219/501 |
| 3,694,669 | 9/1972 | Witt et al. | 307/252 F |

*Primary Examiner*—John Zazworsky

*Attorney, Agent, or Firm*—Fulwider, Patton, Rieber, Lee & Utecht

[57] ABSTRACT

Two-lead electrical control apparatus including a pair of gate controlled switches that form a control switch and a triggering switch, the control switch being connected across a power source and through a load by means of a pair of run leads. A voltage divider circuit is connected with the gate of the triggering switch and includes sensing means responsive to a pre-selected condition to impose a recurring triggering signal on the triggering switch to render such triggering switch conductive to supply a triggering signal to the control switch to thereby trigger the control switch and provide full source voltage across the load.

13 Claims, 4 Drawing Figures

TWO-LEAD ELECTRICAL CONTROL APPARATUS

BACKGROUND OF THE INVENTION

1. Field of the Invention

The present invention relates to a control system for rendering a load, such as a furnace, operative in response to a predetermined condition such as attainment of a selected temperature.

2. Description of the Prior Art

Temperature control systems have been proposed which include a temperature sensitive bridge formed in part by a transformer coil and having the triggering circuit of a silicon controlled rectifier connected between the center tap of such coil and one end thereof. A temperature control system of this type is shown in my U.S. Pat. No. 3,211,214. However, devices of this type suffer the shortcoming that three leads must be run from the power source to the temperature responsive bridge and only one-half the source voltage is imposed across the load.

Temperature control circuits have been proposed which include four layer Shockley diodes responsive to triggering of an SCR to apply full source voltage across a load. A circuit of this type is shown in my U.S. Pat. Nos. 3,489,881 and 3,516,484. However, four layer Shockley diodes are frequently not readily available on the market thereby making fabrication of such systems impractical.

SUMMARY OF THE INVENTION

The present invention is characterized by a gate controlled switch means having its power circuit connected across a power source by means of a pair of run leads and including a gate controlled triggering switch in its triggering circuit. Sensing means is responsive to a predetermined condition to render the triggering switch conductive to apply a triggering signal to the control switch thereby applying full source voltage across the load.

The objects and advantages of the present invention will become apparent from a consideration of the following detailed description when taken in conjunction with the detailed description when taken in conjunction with the accompanying drawings.

DESCRIPTION OF THE PREFERRED EMBODIMENT

Figure 1:
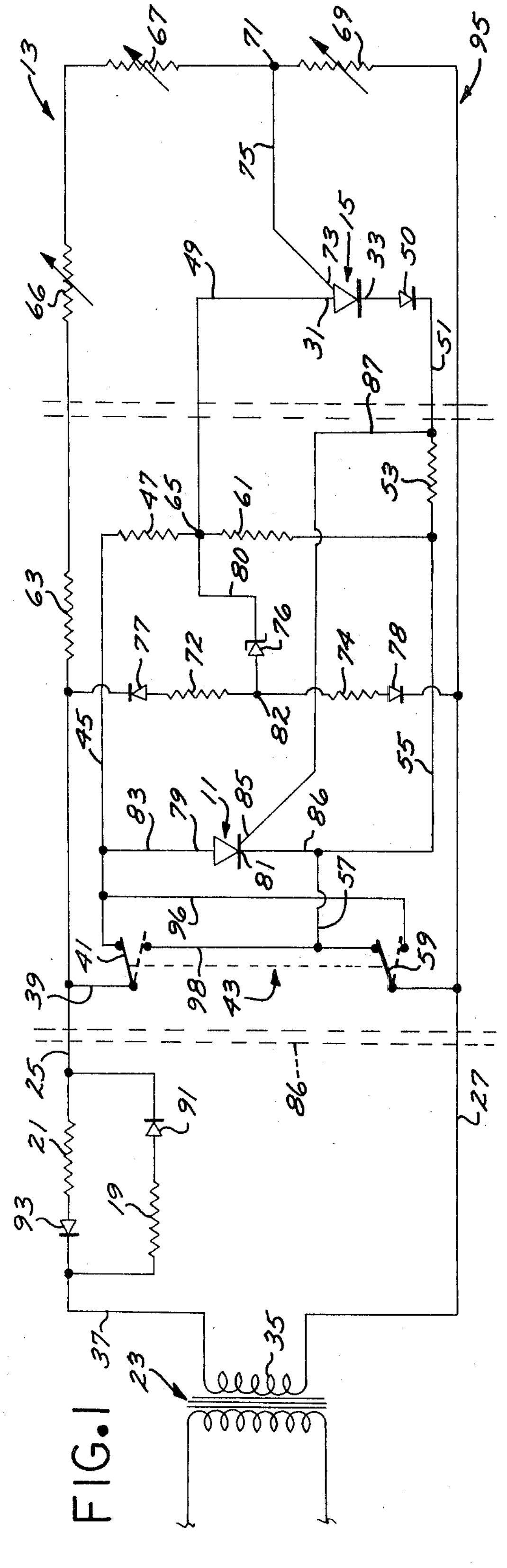
FIG. 1 is an electrical diagram of a two-lead electrical control apparatus embodying the present invention and having a manual switch for directing current between a pair of different loads.

Referring to FIG. 1, the two-lead electrical control apparatus of present invention includes, generally, a control silicon controlled rectifier (SCR) 11 connected with a temperature responsive voltage divider triggering network 13 which includes a programmable unijunction transistor (PUT) 15 that is triggered when the temperature responsive voltage divider circuit is subjected to a predetermined temperature. The SCR 11 is connected across a pair of parallel connected cooling and heating loads 19 and 21, respectively, which are connected in series with a power source in the form of an AC transformer 23 by means of a pair of run leads 25 and 27. Thus, the cooling and heating loads 19 and 21 may be installed adjacent a furnace located, for example, in the basement and only two leads 25 and 27 run from the basement to a thermostat incorporating the voltage divider triggering circuit and when the temperature falls below a predetermined temperature range, the heating operator 21 will be automatically energized.

The anode and cathode 31 and 33, respectively, of the PUT 15 are connected across the secondary coil 35 of the transformer 23 by means of a lead 37, parallel connected loads 19 and 21, lead 25, a lead 39, one contact 41 of a manually operable switch, generally designated 43, lead 45, voltage divider resistor 47, lead 49, protective diode 50 lead 51, current limiting resistor 53, leads 55 and 57, a second contact 59 of the manual switch 43 and, finally, run lead 27. The voltage divider resistor 47 forms one leg of a voltage divider circuit and a second leg thereof is formed by a resistor 61 that cooperates with the resistor 47 to establish a PUT anode voltage at the node 65 formed between such voltage divider resistors 47 and 61.

The voltage divider network 13 includes a second voltage divider circuit having one leg thereof formed by series connected resistor 63, calibrating potentiometer 66 and temperature selection potentiometer 67. The second leg of such voltage divider network 13 is formed by a negative temperature coefficient thermistor (NTC) 69 which cooperates in establishing a PUT gate voltage at the node 71 formed between such NTC and the temperature selection potentiometer 67. The node 71 is connected with the gate 73 of the PUT 15 by means of a lead 75. Connected between the run leads 25 and 27 is a pair of compensating resistors 72 and 74 which are connected in series with respective oppositely facing rectifier diodes 77 and 78. A switching zener diode 76 is connected between the PUT anode node 65 and the juncture formed between such resistors 72 and 74 by means of leads 80 and 82.

The control SCR 11 has its anode and cathode 79 and 81 connected across the secondary transformer coil 35 and the parallel connected loads 19 and 21 by means of leads 37, 25, 39, switch contact 41, leads 83, 86, 57, contact 59 and lead 27. The gate 85 of such SCR 11 is connected with the cathode 33 of the PUT 15 by means of leads 87 and 51. Current is selectively directed through either the heating operator 21 or the cooling operator 19 by means of respective oppositely directed diodes 91 and 93 connected in series therewith.

In operation the control SCR 11, triggering PUT 15 and voltage divider network 13 are normally incorporated in a thermostat 95 which may be mounted in a room of which the temperature is to be controlled. The thermostat 95 conventionally includes a base and cover separated by a wall. The heating and cooling operators 19 and 21 are mounted on a temperature change device such as a combination furnace and air conditioner which may be located in the basement of the house, and the two leads 25 and 27 run through the floor 86 to connect such operators and the thermostat 95 together. The whole system is then connected with the AC transformer 23.

During warmer weather the selector switch 43 is switched to its solid line position to provide for automatic actuation of the cooling air conditioner (not shown) when the room temperature raises above the selected temperature range. As long as the room temperature remains at the target temperature, the NTC 69 will present sufficient resistance to cooperate with the resistor 63 and potentiometers 66 and 67 to maintain the voltage at the node 71 substantially the same as the voltage at the node 65 thereby maintaining the PUT 15 non-conductive. However, if the room temperature exceeds the target temperature, the NTC 69 will be heated thereby lowering the resistance thereof resulting in the node 71 being negative with respect to the node 65 when the top end of the secondary transformer coil 35 is positive with respect to the bottom end, thereby providing a sufficiently negative voltage on the gate 73 of the PUT 15 with respect to the anode 31 to trigger such PUT and initiate flow of triggering current from the top end of the transformer coil 35 through the lead 37, cooling operator 19, leads 39, 45, resistor 47, lead 49, PUT 15, lead 51, resistor 53, leads 55, 57 and 27 thereby initiating current flow in the lead 87 to the gate 85 of the control SCR 11. It will be realized that such triggering current is of insufficient magnitude to heat the cooling operator 19 sufficiently to actuate the controlled cooling system (not shown). Imposition of such current on the gate 85 of the SCR 11 triggers such SCR and renders it conductive to provide a low impedance path therethrough to initiate flow of power current from the top end of the transformer coil 35 through lead 37, cooling operator 19, leads 25, 39, 83, 86, 57 and 27 to operate a switch which will render the air conditioner (not shown) operative to initiate cooling of the environment, it being realized that current flow through the heating operator 21 is blocked by the blocking diode 93.

When the environment has been cooled sufficiently to cool the NTC 69 back to the target temperature, the resistance of such NTC will be increased sufficiently to cause the node 71 to be sufficiently positive with respect to the node 65 when the top end of the secondary coil 35 is positive with respect to the bottom end thereof to discontinue conduction of such PUT thereby discontinuing current to the lead 87 leading to the gate 85 of the control SCR 11 thereby rendering such SCR non-conductive. Such discontinuance of conduction through the SCR 11 de-energizes the cooling operator 19 thereby de-energizing the air conditioner (not shown).

During cooler days the switch 43 is switched to its broken line heating position and when the room temperature falls below the target temperature, the NTC 69 will be cooled sufficiently to raise the resistance thereof to a level which causes the node 71 to be driven sufficiently negative with respect to the node 65 when the bottom end of the coil 35 is positive with respect to the top end to impose a triggering voltage between the gate 73 and anode 31 of the PUT 15 to thereby render such PUT conductive. Triggering of the PUT 15 initiates current flow on alternate half cycles from the bottom end of the secondary transformer coil 35 through the lead 27, contact 59, leads 96 and 45, resistor 47, lead 49, diode 50, lead 51, resistor 53, leads 55, 57, 98, contact 41, lead 39 and heating resistor 21 and lead 37 back to the top end of the coil 35, it being realized that current flow through the cooling operator 19 is blocked by the blocking diode 91. Current flow through the heating operator 21 will energize the heating equipment (not shown) to initiate heating of the environment.

When the environment has been heated sufficiently to heat the NTC 69 to the target temperature, the resistance thereof will have been reduced sufficiently to cause the node 71 to be driven sufficiently positive with respect to the node 65 when the bottom end of the transformer coil 35 is positive with respect to the top end to reduce the voltage between the gate 73 and anode 81 of the PUT 15 sufficiently to discontinue triggering thereof. Accordingly, current through the leads 51 and 87 to the gate 85 of the control SCR 11 will be discontinued thereby rendering such SCR non-conductive and discontinuing current flow through the heating operator 21.

Premature trigger of the PUT 15 as a result of source voltage pulses is prevented by means of the zener diode 76, in combination with compensating circuit rectifier diodes 77 and 78 and resistors 72 and 74. During the cooling mode, when the switch 43 is in its solid line position, current flow from the top end of the transformer secondary coil 35 through the lead 37, cooling operator 19, leads 25, 39, 45, resistors 47, 61 back through the leads 55, 57 and 27 to the bottom end of the transformer coil 35 developes a voltage drop across the resistor 47 to thereby applying a voltage across the zener diode 76. When the voltage drop across such zener diode 76 exceeds the reverse voltage thereof, such diode will be rendered conductive to complete a circuit from the top end of the transformer coil 35, through cooling resistor 19, diode 91, leads 25, 39, 45, 47, the circuit path described above, then through lead 80 zener diode 76, lead 82, compensator diode 78 and resistor 74 back through lead 27 to the bottom of the coil 35. Consequently, any surges in transformer voltage which may tend to drive the node 65 more positive will be compensated for by the fact that such surges also increase the voltage across the compensating resistor 74, thus proportionately increasing the current flow through, and consequently voltage drop across, the resistor 47 to exactly compensate for the voltage change which would otherwise occur at the node 65. It will be evident that proper selection of resistors 47, 61 and 74 can provide for under or over compensation as the circumstances might dictate.

In the heating mode operation of the compensating circuit is substantially as described above except that current flow through the compensating circuit diode 78 is blocked and is directed through the diode 77 and compensating resistor 72.

Figure 2:
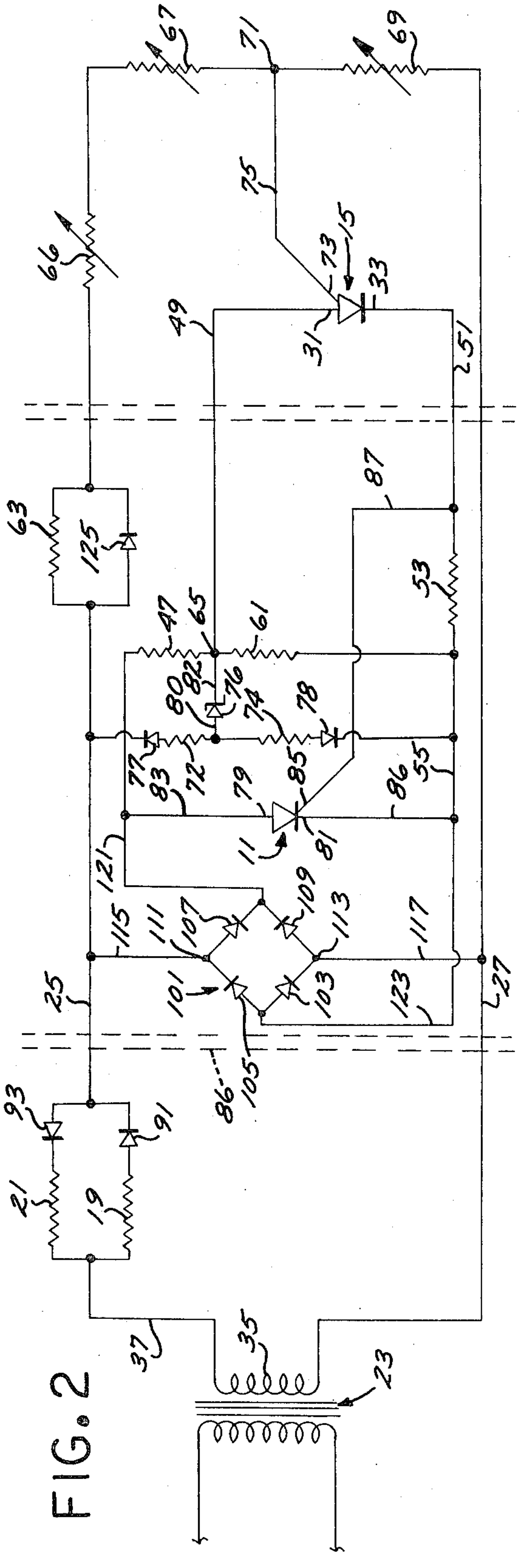
FIG. 2 is an electrical schematic of a second embodiment of the two-lead electrical control apparatus of present invention and including means for automatically directing current between a pair of separate loads.

The two-lead electrical control apparatus shown in FIG. 2 is substantially the same as that shown in FIG. 1 except it includes a hot-cold discriminator circuit in the form a full wave rectifier bridge, generally designated 101, which incorporates respective diodes 103, 105, 107 and 109. the input terminals 111 and 113 of such diode bridge are connected with the respective leads 25 and 27 by means of respective leads 115 and 117. The outlet terminals of such bridge are connected with the anode 79 and cathode 81 of the SCR 11 by means of respective leads 121 and 123. Such control apparatus also includes a deadband circuit consisting of the resistor 63 connected in parallel with a deadband diode 125.

In operation of the control apparatus shown in FIG. 2, at points in time when the top end of the secondary transformer coil 35 is positive with respect to the bottom end, positive going AC current will flow through the lead 37, cooling operator 19, diode 91, leads 25 and 115 through diode 107, lead 121, resistors 47, 61, leads 55, 123 and diode 103 to the lead 27 leading to the bottom of the transformer coil 35. Concurrently, current will flow through the lead 25, diode 125, potentiometers 66 and 67, NTC 69 and lead 27 to the bottom of the transformer coil 35. Consequently, when the room temperature rises above the target temperature and heats the NTC 69 sufficiently to lower the resistance thereof sufficiently to cause the voltage at the node 71 to become sufficiently negative with respect to the voltage at the node 65 to impose a gating voltage between the gate 73 and anode 31 of the PUT 15, such PUT will be triggered to direct operating current flow from the top end of the transformer secondary coil 35 through lead 37, cooling operator 19, leads 25, 115, diode 107, lead 121, resistor 47, lead 49, PUT 15, lead 51, resistor 53, leads 55 and 123, diode 103, leads 117 and 27 to the bottom of the transformer secondary coil 35 to thereby create a voltage drop across the resistor 53 resulting in initiation of triggering current flow through the lad 87 to the gate of the SCR 11 and through the cathode 81 back through the leads 86 and 123 to diode 103 and leads 117 and 27 back to the bottom of the transformer secondary coil 35 thus triggering such SCR 11.

Triggering of the SCR 11 provides a low impedance current path therethrough thus initiating operator current flow from the top end of the transformer secondary coil 35, lead 37, cooling operator 19, diode 91, leads 25 and 115, diode 107, leads 121 and 83, SCR 11, leads 86 and 123 to diode 103 and leads 117 and 27 back to the bottom end of the transformer secondary coil 35. This fully energizes the cooling operator 19 to provide switching on for operation of the air cooling apparatus (not shown). On the subsequent half cycle when the bottom end of the transformer secondary coil 35 is positive with the respect to the top end, the node 71 will be positive with respect to the node 65 thereby preventing triggering of the PUT 15 and discontinuing triggering of the control SCR 11.

When the cooling (not shown) cools the room sufficiently to cool the NTC 69 sufficiently to raise the resistance thereof a sufficient amount to cause the node 71 to become sufficiently positive with respect to the node 65 when the top end of the transformer secondary coil 35 is positive with respect to the bottom end to lower the voltage differential between the gate 73 and anode 31 below the triggering voltage of the PUT 15, triggering of such PUT will be discontinued thereby discontinuing triggering of the SCR 11 and enabling the cooling operator 19 to shut off the cooling (not shown).

When a call for heating is received, the SCR 11 can be thought of as being triggered at points in time when the bottom end of the transformer secondary coil 35 is positive with respect to the top end. At such moments in time current will flow from the bottom end of the transformer secondary coil 35 through leads 27 and 117, diode 109, lead 121, resistors 47, 61, leads 55 and 123 through diode 105, leads 115, 25, diode 93 and heating operator 21 and through lead 37 to the top end of the transformer coil 35. Concurrently, current will flow from the bottom end of the transformer coil 35 through lead 27, NTC 69, potentiometers 66, 67 and deadband resistor 63, lead 25, diode 93, operator 21 and lead 37 to the top end of the transformer coil 35. Thus, when the environmental temperature becomes sufficiently cool to cool the NTC 69 below the target temperature, the resistance of such NTC will be raised sufficiently to cause the node 71 to become sufficiently negative with respect to the node 65 to impose a triggering voltage between the gate 73 and anodes 31 of the PUT 15 to trigger such PUT. Triggering of such PUT 15 initiates current flow through the power circuit thereof and through leads 51 and 87 to the gate 85 of the SCR 11 and back from the cathode 81 through leads 86, 123, diode 105 and leads 111 and 25 to the top end of the transformer coil 35 thereby triggering such SCR 11. Triggering of the SCR 11 provides a low impedance path from the bottom end of the transformer coil through leads 27, 117, diode 109, leads 121, 83 and through the power circuit of such SCR 11 through leads 86, 123, diode 105, leads 115 and 25 and through the diode 93 and operator 21 back through lead 37 to the top end of the transformer coil 35 thereby actuating such heating operator 21 to actuate the heating source (not shown) to initiate heating of the environment. When the environment becomes sufficiently heated to heat the NTC 69 back to the target temperature, the resistance thereof will be lowered sufficiently to cause the voltage at the node 71 to become more positive with respect to the node 65, thus reducing the voltage between the gate 73 and anode 31 of the PUT 15 below the triggering voltage to thereby discontinue conduction through such PUT and, consequently, discontinue triggering of the SCR 11.

It will be realized that since the deadband diode 125 provides a low impedance path during actuation of the PUT 15 to initiate current flow to the cooling operator 19 and the deadband resistor 63 provides a high impedance path during triggering of such PUT for initiation of current flow through the heating operator 21, a definite temperature range will be provided between deenergization of the cooling operator 19 and energization of the heating operator 21 thereby providing several degrees of temperature near the target temperature during which neither the heating operator 21 or the cooling operator 19 is actuated.

Figure 3:
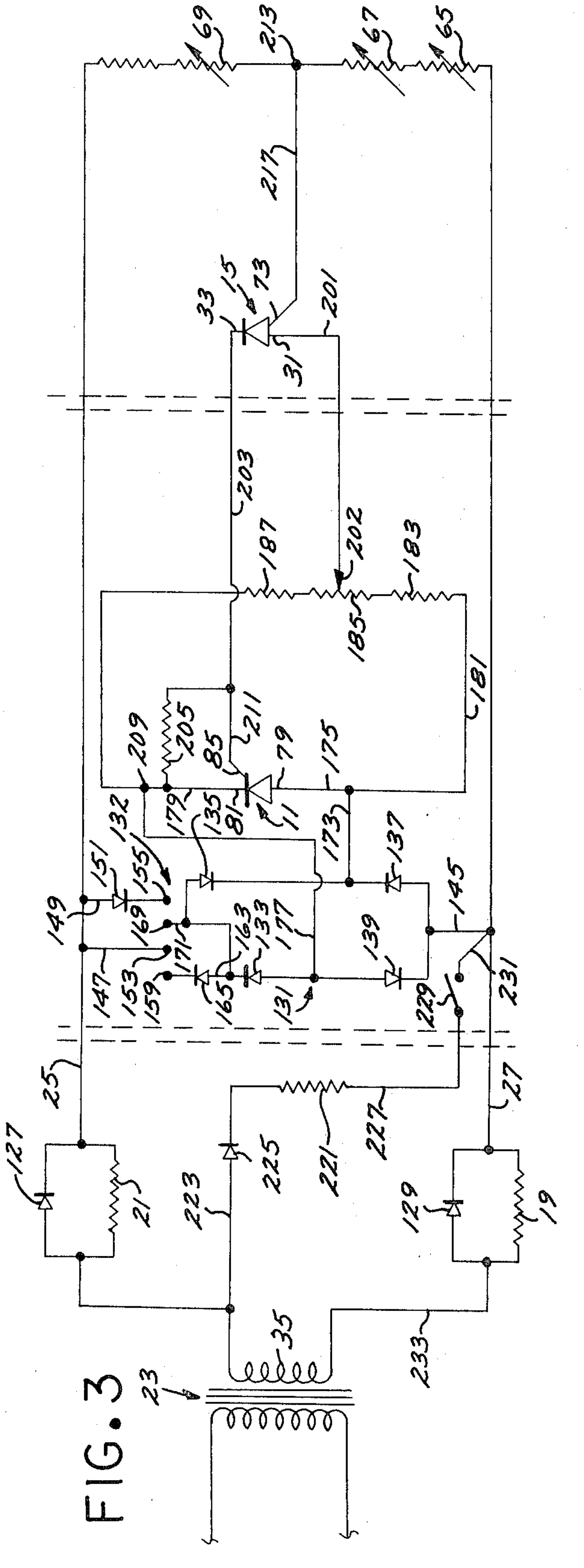
FIG. 3 is an electrical schematic of a third embodiment of the two-lead electrical control apparatus of present invention and including both manual and automatic means for directing current between a pair of loads.

The control apparatus shown in FIG. 3 is similar to that shown in FIG. 1 except that it includes a discriminator bridge, generally designated 131, connected with a selector switch, generally designated 132, to thereby enable selection of either heating, cooling or automatic change-over between heating and cooling. To illustrate an alternate method of connecting the leads, in this case the cooling and heating operators 19 and 21 are connected with the respective run leads 25 and 27 and have respective diodes 127 and 129 connected in parallel therewith.

The diode bridge 131 includes rectifying diodes 133, 135, 137 and 139. One input terminal of the bridge 131 is connected with the run lead 27 by means of an input lead 145 and the other input of the diode bridge is connected with the run lead 25 by means of the selector switch 132 and selective ones of leads 147 and 149, the lead 149 including a diode 151. One side of the selector switch 132 includes a first contact 153 connected with the lead 147 and a second contact 155 connected with the lead 149. The opposite side of the selector switch 132 includes a heating contact 159 connected with one side of the rectifier bridge 131 by means of a lead 163 which includes a diode 165 and an automatic heating and cooling contact 169 connected with the bridge 131 by means of a lead 171. The outlet terminals of the rectifier bridge 131 are connected across the anode and cathode of the SCR 11 by means of leads 173, 175, 177 and 179.

Also connected across the outlet terminals of the rectifier bridge 131 is a voltage divider circuit including lead 181, voltage divider resistor 183, adjustable resistor 185, voltage divider resistor 187. The anode-cathode circuit of the PUT 15 is connected across the output terminals of the rectifier bridge 131 by means of leads 173, 181, resistors 183, 185, leads 201, 203, resistor 205 and leads 179 and 177. It will be noted that the wiper 202 of adjustable resistor 185 forms a voltage divider node that is connected with the anode 31 of the PUT 15 by means of the lead 201. The cathode 33 of the PUT 15 is connected with the gate 85 of the SCR 11 by means of leads 203 and 211. The gate 73 of the PUT 15 is connected with a voltage divider node 213 formed between the NTC 69 and potentiometer 67 by means of a lead 217.

A blower control solenoid 221 is connected across the transformer secondary coil 35 by means of lead 223, diode 225, lead 227, blower control switch 229, lead 231, lead 27, diode 129 and lead 233.

In operation, the control system shown in FIG. 3 may be set to automatically operate either or both the cooling operator 19 and heating operator 21. If the selector switch 132 is set to have its slider contact engaged with the cooling contacts 153 and 159, operation of the system is substantially the same as that for FIG. 1 when the selector switch 43 is in its solid line position except that the diode serve as automatic switches. Thus, when the NTC 69 is heated above the target temperature to decrease the resistance thereof sufficiently to render the voltage divider node 213 sufficiently negative with respective to the voltage divider node 202 to impose a triggering voltage between the gate 73 and anode 31 of the PUT 15, when the bottom end of the transformer coil 35 is positive with respect to the top end, such PUT will be rendered conductive on alternate half cycles to impose alternate half cycle triggering pulses on the gate 85 of the SCR 11 to thereby render such SCR conductive on such alternate half cycles to initiate current flow from the bottom end of the transformer secondary coil 35 through leads 233, cooling motor 19, lead 27, lead 145, diode 137, leads 173 and 175, SCR 11, leads 177 and diodes 133 and 165, and through leads 153, 147, 25, diode 127, back to the top end of such transformer coil 35 thereby energizing the cooling operator 19 to initiate cooling of the environment. On the subsequent half cycle when the bottom end of the transformer secondary coil 35 is negative with respect to the top end, the node 213 will be positive with respect to the node 202 thereby preventing triggering of the PUT 15 and consequent triggering of the control SCR 11. When the environment has been cooled sufficiently to raise the resistance of the NTC 69 sufficiently to reduce the voltage imposed between the gate 73 and anode 31 of the PUT 15 below the triggering level of such PUT, triggering thereof will be discontinued and the SCR 11 will be rendered non-conductive to de-energize the cooling operator 19.

If the environment becomes cooled below the target temperature and the selector switch 132 remains set at its cooling position, energization of the heating operator 19 is prevented because when the top end of the transformer coil 35 is positve with respect to the bottom end, current flow through such heating operator 21, leads 25, 147 and 163 in through the top end of the rectifier bridge circuit 131 is blocked by means of the diode 165 thereby preventing current flow through the power circuit of the SCR 11.

When the selector switch 132 is switched to have its slider complete a circuit from the energization contact 153 to the automatic change-over contact 169, operation of the apparatus will be substantially the same as that for the apparatus shown in FIG. 2. The heating operator 21 will be energized any time the temperature of the NTC 69 falls below target range and the cooling operator 19 will be energized any time the temperature rises above the target range.

When the selector switch 132 is positioned to complete a circuit between the diode bridge contact 169 and heating contact 155, the heating operator 21 will be energized on alternate half cycles any time the NTC 69 is cooled below the target range. Such energization results from the NTC 69 being cooled sufficiently to raise the resistance thereof to a level that will result in the voltage divider node 213 being sufficiently negative with respect to the voltage divider node 202 when the top end of the transformer secondary coil 35 is positive with respect to the bottom end to impose a triggering voltage between the gate 73 and anode 31 of the PUT 15 to trigger such PUT and initiate current flow therethrough to impose a triggering current on the gate 85 of the SCR 11. Triggering of such SCR 11 on alternate half cycles initiates current flow from the top end of the coil 35 through the heating motor 21, leads 25 and 149, diode 151, lead 171, diode 135, leads 173, 175, 179 and 177, diode 139, leads 145 and 27, diode 129, and lead 233 to the bottom end of the coil 35. This energizes the heating operator 21.

Energization of the cooling operator when the NTC 69 is heated above the target range is prevented since current flow through the rectifier circuit 131 is blocked by means of the cooling operator blocking diode 151 when the bottom end of the secondary transformer coil 35 is positive with respect to the top end thereof. On alternate half cycles such PUT 15 is rendered non-conductive since the voltage imposed on the node 213 is positive with respect to the voltage on the node 202.

If it becomes desirable to operate the blower (not shown) controlled by the blower solenoid 221, the fan switch 229 may be closed to initiate current flow on alternate half cycles from the top end of the transformer coil 35 through the lead 223, diode 225, solenoid 221, lead 227, switch 229, leads 231, 27, diode 129 and lead 223. On alternate half cycles when the bottom end of the transformer coil is positive with respect to the top end, current flow from the bottom end of such transformer coil and through the leads 233, cooling motor operator 19, leads 27 and 231, closed switch 229, lead 227, coil 221, diode 225 and lead 223 is blocked by means of such diode 225 thereby preventing current flow through solenoid 221 and cooling operator 19.

Figure 4:
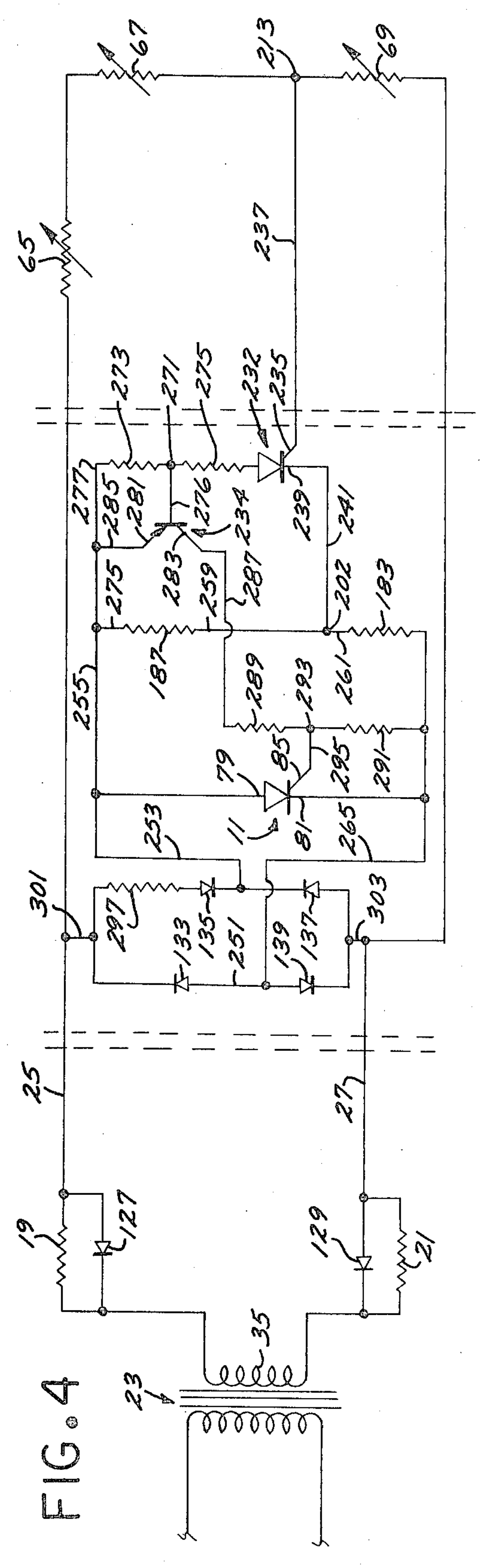
FIG. 4 is an electrical schematic of a fourth embodiment of the present invention.

The two-lead electrical control apparatus shown in FIG. 4 is substantially the same as that shown in FIG. 3 except that the triggering switch means is in the form of a triggering SCR 232 which triggers a transistor 234 to render the SCR 11 conductive. The gate 235 of the SCR 232 is connected with the voltage divider node 213 by means of a lead 237 and the cathode 239 of such SCR is connected with the voltage divider node 202 by means of a lead 241. The voltage divider resistors 183 and 187 are connected across the outlet from a full wave diode rectifier bridge, generally designated 251, by means of leads 253, 255, 257, 259, 261, 263 and 265. Series-connected voltage divider resistors 273 and 275 are connected in the power circuit of the SCR 232 and are connected across the outlet of the rectifier bridge 251 by means of the leads 253, 255, 277, resistors 273, 275, SCR 232, lead 241, resistor 183 and leads 263 and 265. A voltage divider node 271 is formed between resistors 273 and 275 and is connected with the base of the transistor 234 by means of a lead 276.

The emitter 281 and collector 283 of the transistor 234 are connected across the output terminals of the rectifier bridge 251 by means of the leads 253, 255, leads 285, 287, voltage divider resistors 289, 291 and lead 263 and 265. A node 293 formed between the resistors 289 and 291 is connected with the gate 85 of the control SCR 11 by means of a lead 295.

The rectifier bridge 251 is substantially the same as the rectifier bridge 131 shown in FIG. 3 except that it includes an anticipator resistor 297 and is connected directly between the leads 25 and 27 by means of leads 201 and 303. Operation of the control apparatus shown in FIG. 4 is substantially the same as that for the apparatus shown in FIG. 3 except that when the NTC 69 is cooled sufficiently to drive the voltage divider node 213 sufficiently positive with respect to the node 202 when the top end of the transformer secondary, coil 35 is positive with respect to the bottom end to impose a triggering voltage between the gate 235 and cathode 239 of the SCR 232, such SCR will be rendered conductive on alternate half cycles. Conduction through the SCR 232 initiates signal current flow from the top end of the transformer coil 35 through the heating load 19, leads 25, 301, anticipator resistor 297, diode 135, leads 253, 255, voltage divider resistors 273, 275, power circuit of SCR 232, lead 241, resistor 183, lead 263, and through diode 139, lead 27 and diode 129 back to the bottom end of the secondary coil 35. The resultant voltage drop across the voltage divider resistor 273 produces sufficient current flow from the emitter 281 through to the base of the transistor 234 to render such transistor sufficiently conductive to initiate sufficient current flow through the emitter 281 through collector 283 circuits to trigger the control SCR 11. Such triggering is effected by current flow from the top end of the transformer coil 35 through heating load 19, leads 25, 301, resistor 297, diode 135, leads 253, 255 and 285 through the transistor 234, lead 287, resistors 289 and 291, leads 265, diode 139, lead 303, diode 129 and back to the bottom end node 8 of the transformer coil 35. The resultant voltage drop across the voltage divider resistor 291 produces sufficient current flow through the lead 295, gate 85 and cathode 81 of the SCR 11 to trigger such SCR and initiate curent flow from the outlet of the rectifier bridge 251, through leads 253, anode to cathode of SCR 11, lead 265, diode 139, lead 303, diode 129 and back to the bottom end of the transformer coil 35 thereby fully energizing the heating operator 19. Again, when the NTC 69 becomes sufficiently heated, the resistance thereof will be lowered sufficiently to render the SCR 232 non-conductive to discontinue energization of the heating operator 19.

Similarly when the NTC 69 is heated sufficiently to lower the resistance thereof a sufficient amount to cause the voltage divider node 213 to become sufficiently positive with respect to the node 202 when the bottom end of the transformer coil 35 is positive with respect to the top end to produce a triggering voltage between the gate 235 and cathode 239 of the triggering SCR 232, such SCR will be rendered conductive to trigger the transistor 234 and control SCR 11 thereby fully energizing the cooling operator 21.

From the foregoing it will be apparent that the two-wire electrical control apparatus of present invention provides a convenient and inexpensive means for imposing the full voltage of an AC source on a load which requires that only two leads be run between the load and the voltage divider control circuit to significantly reduce the installation expense of thermostats in various buildings of which the temperature is to be controlled.

Various modifications and changes may be made with regard to the foregoing detailed description without departing from the spirit of the invention.

What is claimed is:

1. Two-lead electrical control apparatus comprising:

load means including a one end and an other end adapted to receive at one end thereof an electrical A.C. sgnal, said load means including a first and second load connected in parallel between said one and other ends, first and second one way opposed current blocking means connected in series with said respective first and second loads;

gate controlled control switch means connected in circuit with the other end of said load means and including a gate terminal for controlling the conduction thereof;

a triggering circuit connected to the gate terminal of said control switch means including triggering switch means responsive to a selected electrical signal difference to be rendered conductive and impose a triggering signal on said gate terminal;

voltage divider circuit means connected to said triggering switch means and including sensing means responsive to a predetermined condition to impose a first electrical signal on the gate terminal of said triggering switch means; and circuit means adapted to be connected across the A.C. signal and connected to said load means including compensation means for regulating a second electrical signal to be compared with said first electrical signal to produce said signal difference whereby when said sensing means senses said predetermined condition, said electrical signal difference will be imposed on said triggering switch means to render said triggering switch means conductive to impose said triggering signal on said control switch means to electrically couple said load means across said power source.

2. Two-lead electrical control apparatus as set forth in claim 1 further comprising:

two position switch means connected across said control switch means and operative to be switched to one position to direct current in one direction through said first load and to a second position to direct current in the opposite direction through said second load.

3. Two-lead electrical control apparatus as set forth in claim 1 wherein:

said control switch means is a silicon controlled rectifier having the anode to cathode circuit thereof connected across said voltage divider circuit means; and said triggering switch means is a programmable unijunction transistor having the anode to cathode circuit thereof connected with the gate terminal of said silicon controlled rectifier.

4. Two-lead electrical control apparatus as set forth in claim 1 wherein:

said voltage divider circuit means includes first, second, third and fourth legs formed by respective first voltage divider resistance means, temperature responsive resistor means and second and third voltage divider resistance means and circuit means connecting said first and second legs in series and forming a first node therebetween and said third and fourth legs in series to form a second node, said circuit means further connecting said first and second nodes with the said triggering switch means.

5. Two-lead electrical control apparatus as set forth in claim 1 wherein:

at least one of sid switch means is forward biased and said apparatus includes selector switch means connected across said control switch means and across said voltage divider circuit means; and said load means including first and second loads connected in parallel with one another and in series with said selector switch means and oppositely directed circuit blocking means connected in series with said respective first and second loads whereby said selector switch means may be switched to reverse the polarity across said loads and said one switch means when the polarity of said voltage divider circuit means is reversed.

6. Two-lead electrical control apparatus as set forth in claim 1 that includes:

said compensation means including a compensator circuit connected in parallel with one side of said triggering switch means and including a current limiting resistor and compensating switch means responsive to predetermined voltage of said second electrical signal thereacross to be rendered conductive and initiate current flow through said compensating resistor and one leg of said triggering switch means at a rate proportional to the amount by which said predetermined voltage of said second electrical signal is exceeded.

7. Two-lead electrical control apparatus as set forth in claim 1 for use with an A.C. source and that includes:

discrimination means connectd with said load means and said voltage divider circuit means for responding to the unbalance of said voltage divider circuit means in one direction to direct current in one direction through said load means.

8. Two-lead electrical control apparatus as set forth in claim 7 wherein:

said load means includes first and second loads; and said discriminator means includes rectifier means and oppositely directed one-way current blocking means connected in series with said first and second loads.

9. Two-lead electrical control apparatus as set forth in claim 8 that includes:

two position selector switch means connected on one side with said discriminator means; and circuit means connected with the side of said selector switch means opposite said one side having said first load connected with a first contact of said selector switch means and providing for two-way current flow and said second load including one-way current blocking means for providing a current path from one of said loads but blocking current flow from the other of said loads.

10. Two-lead electrical control apparatus comprising:

load means adapted to receive at one end thereof an electrical A.C. signal;

gate controlled control switch means connected in circuit with the other end of said load means;

a first voltage divider circuit means connected across said A.C. signal and including sensing means responsive to a predetermined condition to produce a first electrical signal of an amplitude corresponding to the amplitude of said sensed condition;

a second voltage divider circuit comprising an upper resistive leg and a lower resistive leg connected in common at respective one ends thereof to provide a second electrical signal thereat;

triggering circuit means connected to receive said first and second electrical signals to produce a gating signal to said gate controlled control switch means upon a predetermined combination of said first and second electrical signals for rendering said gate controlled control switch means conductive; and rectifying means respectively connected in series to said upper and lower resistive legs for selectively imposing alternate halves of said A.C. signal thereon.

11. Two-lead electrical control apparatus according to claim 10 wherein:

said load means including a first and second load respectively connected to receive at one end thereof said A.C. signal, and first and second rectifying means disposed respectively in parallel with said first and second loads for shunting opposite halves of said A.C. signal thereacross.

12. Two-lead electrical control apparatus according to claim 10 wherein:

said control switch means is a silicon controlled rectifier having the anode to cathode circuit thereof operatively connected across said A.C. signal; and said triggering circuit means is a programmable unijunction transistor having the anode to cathode circuit thereof connected with the gate of said silicon controlled rectifier.

13. Two-lead electrical control apparatus according to claim 11 further comprising:

semiconductor means interposed between said triggering circuit means and said gate controlled control switch means for being rendered conductive when said triggering circuit means is producing said gating signal.

* * * * *